Dec. 31, 1929.　　　J. F. BERRY　　　1,742,123
AUXILIARY SUSTAINING AND PROPELLING MEANS FOR AIRPLANES
Filed Feb. 21, 1929　　　2 Sheets-Sheet 1

Inventor
J. F. Berry
By Watson E. Coleman
Attorney

Dec. 31, 1929.   J. F. BERRY   1,742,123
AUXILIARY SUSTAINING AND PROPELLING MEANS FOR AIRPLANES
Filed Feb. 21, 1929    2 Sheets-Sheet 2
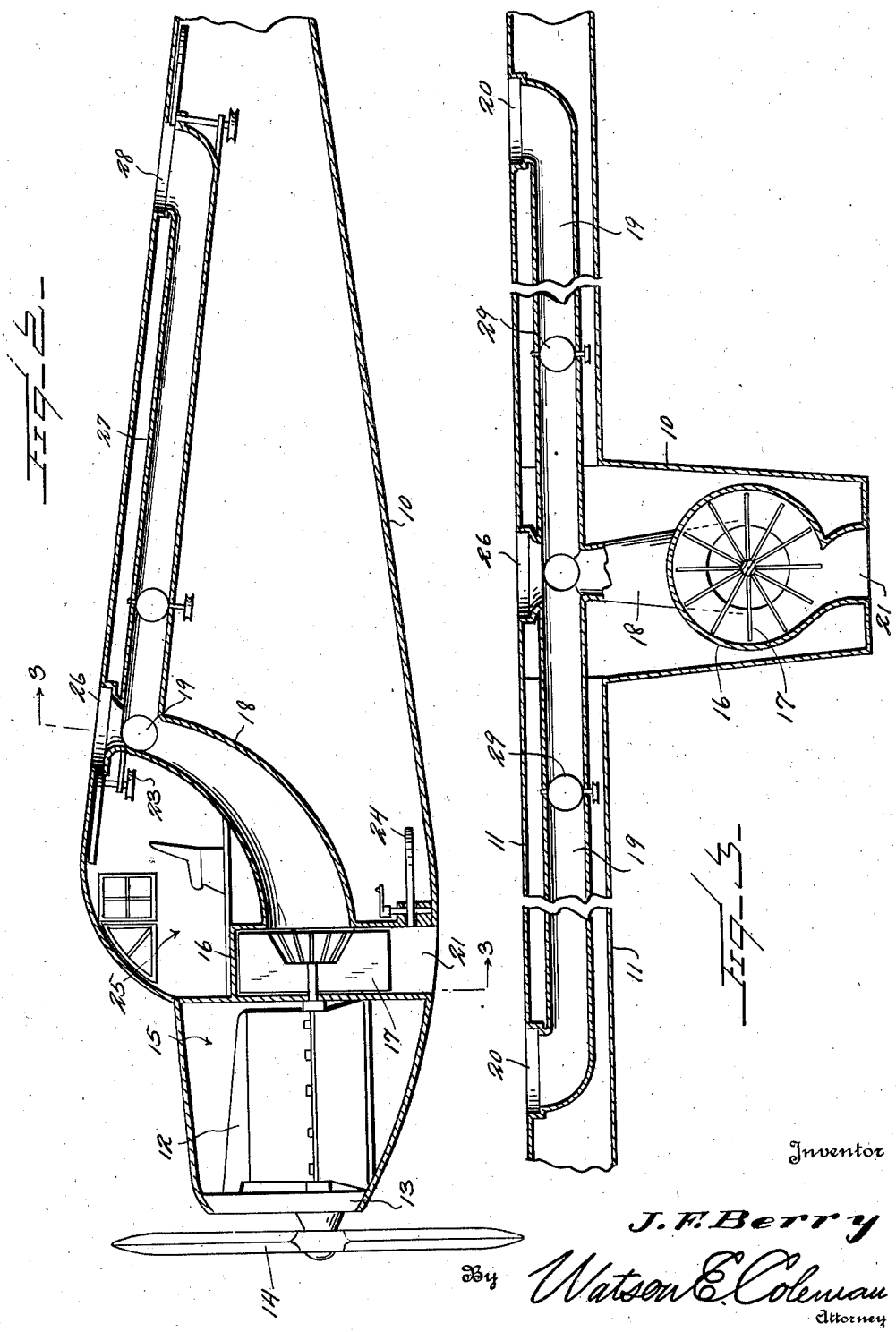
Inventor
J. F. Berry
By Watson E. Coleman
Attorney Patented Dec. 31, 1929

1,742,123

UNITED STATES PATENT OFFICE

JOHN FRANKLIN BERRY, OF LEWIS, IOWA

AUXILIARY SUSTAINING AND PROPELLING MEANS FOR AIRPLANES

Application filed February 21, 1929. Serial No. 341,738.

This invention relates to airplanes and has for its object the provision of means whereby the vacuum above the wings of the plane may be increased and a further object in this connection is to provide an engine driven exhaust fan mounted in an airplane in such position and so connected as to cause a vacuum to be created above the wings of the plane and above the body of the plane and to cause a compression of the air below or behind the body and wings by discharging the air from said exhaust fan beneath or behind the fuselage of the plane, a created vacuum above and a compression of the air below the body to be used for causing the plane to be lifted in, sustained in or lowered in the air.

Other objects will appear in the course of the following description.

My invention is illustrated in the accompanying drawings, wherein:—

Figure 2 is a longitudinal sectional view through the fuselage of the plane;

Figure 3 is a vertical section on the line 3—3 of Figure 2.

Figure 1:
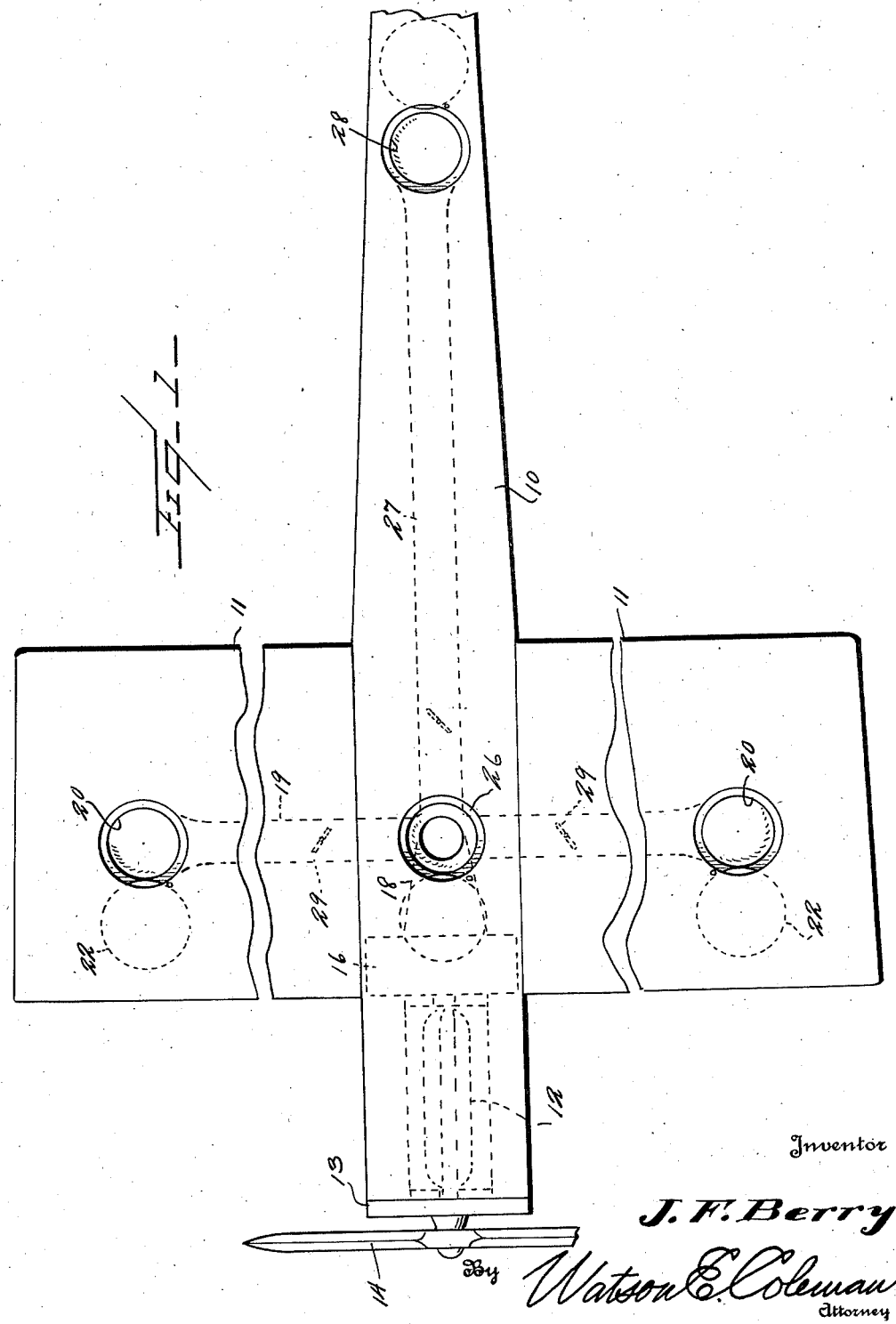
Figure 1 is a plan view of an airplane having my improvement applied thereto.

Referring to the drawings, it will be seen that I have illustrated an ordinary plane having the fuselage 10 and the single aerofoil or wing 11 of any usual or suitable form. The engine 12 is disposed in the nose or forward end of the fuselage behind the radiator 13 and, of course, the machine is provided with the usual propeller 14. Disposed behind the engine cowl of the engine compartment 15 is a fan compartment 16 wherein is disposed an exhaust fan 17 of any suitable character driven by the shaft of the engine. Entering the compartment 16 is a wind trunk 18 which extends upward to any suitable height and is connected to wind trunk branches 19 extending in opposite directions along the body of the wing or plane 11 and opening upon the upper surface of the plane as at 20. The exhaust compartment 16 has a discharge opening 21 shown as discharging downward through the fuselage.

Mounted upon the wing 11 in conjunction with each of the openings 8 is a cover 22 shown as a sliding cover pivoted upon a vertical shaft 23 having a crank arm. The opening 21 is also capable of being controlled by a rotatable cover 24.

Each of these covers is mounted upon a shaft as before stated, each shaft being shown as provided with an arm and there being push and pull rods or equivalent elements leading into the pilot's compartment 25. These controlling means for the several covers or valves are such that the pilot may control any one of these valves or covers independently of each other. The duct 18 will preferably extend upward to the top surface of the fuselge opening through this top surface as at 26, this opening 26 being likewise provided with a swinging cover 22 and preferably a duct 27 leads rearward through the fuselage from the duct 22 and opens upon the upper face of the fuselage as at 28. This opening may also be provided with a cover whereby passage therethrough may be controlled.

Disposed within these several ducts or branches are the dampers 29 for the purpose of balancing the plane by controlling the suction through these different ducts, these dampers being connected by means of links and levers to a control at the pilot's seat so that he can control the balance of the plane by giving one duct more air than another, thereby lifting or lowering the plane at one or more points as the case might be for balancing, it being understood that the vacuum is created by the fan above and around the intake ports while pressure is created around the exhaust port. The covers 22 are mainly for the purpose of keeping out the water from the openings 20 or 26 and for the purpose of preventing any suction from being created at these points when the plane is moving forward. The cover 24 as before stated may be also provided for the exhaust port or for the same purpose.

While I have illustrated ducts which open upon the top of the plane either through the fuselage or through the wings and have shown the outlet port as opening through the bottom of the fuselage, I wish it to be understood that inlet ports might be in front of the plane and the outlet port behind for the purpose of causing the propulsion of the machine.

While this construction is best suited to a monoplane where the intake ducts can be incorporated in the structure of the upper wing or in the braces of the plane, thereby making the wing stronger, I do not wish to be limited to this. The ducts in the wings are so placed that they do not interfere with any other apparatus on the plane and the duct running to the rear of the fuselage may be so placed that it will not interfere with the carrying capacity of the plane. This invention if properly installed will add very little weight and will not change the outward design at all. The exhaust fan is mounted directly behind the motor and is connected thereto by a clutch. The propeller in front of the plane is also, of course, connected to the motor by a clutch and the operation of these clutches is under control of the pilot. It will be seen that both the propeller and the exhaust may be used simultaneously or independently.

I claim:—

1. In an airplane, an engine driven exhaust fan and casing therefor and inlet ducts leading to the fan casing from one face of the airplane structure and a discharge duct leading from the fan casing to an opposite face of the airplane structure and manually controllable covers mounted upon the airplane structure and adapted to close the open ends of the ducts, the covers being independently operable, the ends of the ducts having enlargements to receive said covers and said covers being disposed for sliding movement within the outer covering of the airplane structure and shiftable into place within said enlargements to close said ducts.

2. In an airplane having a fuselage and a wing, an engine driven exhaust fan and casing therefor disposed in the fuselage, air inlet ducts leading from the fan casing into said wing and opening upon the upper face of the wing at a plurality of points, the fan casing having a discharge duct leading to the under face of the fuselage, the ends of the inlet duct on the upper face of the wing having manually controllable independently operable covers movably disposed within the outer covering of the fuselage and wings and said inlet ducts being provided with independently operable manually controllable dampers.

3. In an airplane having a fuselage and a wing extending in opposite directions from the fuselage, an engine driven exhaust fan and casing therefor disposed within the fuselage, an upwardly and rearwardly extending duct leading from said fan to the top of the fuselage and having branches leading laterally toward the ends of the wing, there being an opening through the top of the fuselage and through the wings at the ends of said ducts, the main duct having a rearward extension extending toward the tail of the fuselage and opening upon the upper surface thereof, said fan casing having a duct discharging downward through the bottom of the fuselage, and means for differentially controlling the suction through any one of said openings independently of any other opening to thereby control the balance of the plane.

In testimony whereof I hereunto affix my signature.

JOHN FRANKLIN BERRY.